Nov. 1, 1966   R. L. SIROIS   3,282,457
MULTI-PURPOSE ELASTIC STOPPERS
Filed Oct. 1, 1965

INVENTOR.
RODNEY L. SIROIS
BY
Robert Ames Norton
ATTORNEY

United States Patent Office 3,282,457
Patented Nov. 1, 1966

3,282,457
MULTI-PURPOSE ELASTIC STOPPERS
Rodney L. Sirois, Easthampton, Mass., assignor to United Elastic Corporation, Easthampton, Mass., a corporation of Massachusetts
Filed Oct. 1, 1965, Ser. No. 492,244
2 Claims. (Cl. 215—47)

This invention relates to an improved stopper of rubber of similar elastic material provided with one or more holes which can be selectively opened for the insertion of tubing, such as glass tubing.

In the past two kinds of rubber stoppers, using rubber in its generic sense to cover other elastomeric material, were made in two general styles. One was a solid stopper, and the other had one or more holes through which tubing, such as glass tubing, could be pushed. This presented a problem because some stoppers required a single hole, usually centrally located, others required two, and some had three, four or more. Obviously, of course, if one wanted a stopper of a given size for a single tube, it was not practical to use a stopper that had more than one hole and, similarly, if one required a stopper with two holes, one could not effectively use a three-hole stopper. As a result, a very large inventory was required in a laboratory, each size of stopper being required in a number of styles: solid, one-hole, two-hole, three-hole, etc. For some uses an even more serious problem arose because it is difficult to keep a stopper with holes already bored through it in a sterile state or even in a state in which more gross contaminations, such as dust, are not present. These tended to accumulate in the holes and then when a glass tubing was inserted it usually pushed the contaminant out. Of course it is possible to have a large inventory stored under suitable aseptic conditions, but this presented a problem because of the large number of stoppers which had to be stocked.

Many years ago it was proposed in the patent to E. J. Nawoj et al., No. 2,340,419, to produce a stopper for use with injectable solutions. This stopper had thin membranes covering the top of two holes, with tabs which could be grasped to pull off the thin membranes. It was not useful as a multi-purpose stopper because if it is attempted to leave the membranes and tabs in place and use it as a solid stopper, anything striking the tabs could accidentally pull off a membrane. It is, therefore, only useful for temporarily closing a flask containing material for injection. This stopper is also useless as a solid stopper for another reason, because solid stoppers are often reused in a laboratory and the permanently open holes accumulate materials from the flask in which the stopper is first used and it is practically impossible, or at least impractical to clean them out.

It has also been proposed to make stoppers with thin membranes in the holes, for example as illustrated in the Brandon Patents 2,155,397 and 2,421,313. These stoppers it is true did not have injecting tabs for membranes covering the tops of the holes and so it is theoretically possible to use the stoppers as solid stoppers except for the drawback of impracticability of reuse because the holes are open at the bottom. However, the stoppers presented another and perhaps more serious, problem which rendered their use as multiple purpose stoppers undesirable. When the membranes remained intact the stopper was in effect a solid stopper, but if a glass tube had to be inserted, or several glass tubes, they could be pushed through the membranes in the respective holes, breaking the membrane and thus permitting a stopper with, let us say, three membrane-controlled holes to serve either as a solid stopper, a one-hole stopper, a two-hole stopper, or a three-hole stopper. These stoppers were some improvement over the enormous inventories required in the past and have proven to be practically successful. Nevertheless, they have some serious drawbacks, and it is with the elimination of these drawbacks and the production of improved multiple-purpose stoppers that the present invention deals.

One of the problems presented by the membrane-closed holes of the prior patents referred to above is that the strength of the membrane is quite critical. If it is too weak and if this results in thin spots, undesired rupture can take place and the membrane will not withstand vacuum and pressure conditions, which often arise in a flask or other container closed by a stopper. On the other hand, if the membrane is too strong, this can result in the need for excessive force to puncture the membrane with a glass tube and occasionally tubes have even broken, with the serious risk of injury to the hands from the broken glass tubing. The above drawbacks are entirely eliminated in the improved stoppers of the present invention without in any way adversely affecting the good features of versatility, reduced inventory, possibility of sterile storage, and the like. In other words, the present invention is not a compromise but retains all of the advantages of the prior art constructions.

Essentially in the present invention the stoppers are provided with holes in the desired number extending entirely through the stopper. The bottom surface is provided with hollow projections over each hole of substantial length, for example ¼" to ½". These hollow projections can be grasped with fingers of one hand, the stopper with the other hand, and by a twist the projection is twisted off, without the fingers encountering the bottom surface of the stopper and thus leading to contamination thereof when aseptic conditions are required. The hollow projections over each hole can be of much thicker walls than is practical with membranes which have to be broken by forcing a tube through the stopper. The amount of force which can be exerted by twisting is quite substantial, and therefore hollow projections can be strong enough to resist any conditions of vacuum or pressure to which the stopper might be exposed in use. At the same time, any risk of injury from a broken glass tube when membranes have to be ruptured is eliminated and the other advantages of drastically limited inventory, practicality of sterile storage or sterile packages of a small number of stoppers or even a single stopper are fully retained. When the stopper is to be used as a solid stopper, there is no risk of accidental perforation because the force available by twisting with the two hands is so great that the hollow projections are never accidentally punctured.

The closed and hollow projections at the bottom of the holes of the stoppers according to the present invention not only present no problem of critical membrane thickness but also they effect closure of the holes so that when used as a solid stopper the stopper can be washed and reused.

Most elastic stoppers are made of rubber, natural or synthetic, because they are cheap and for most purposes highly satisfactory. However, for certain special purposes other elastomers, such as neoprene, butadiene-acrylonitrile copolymers, polyvinyl chloride, polyurethane and the like, may be used where their particular properties, such as resistance to attack by certain solvents, make them desirable in spite of a normally somewhat higher cost. It is an advantage of the present invention that the improved stoppers do not depend on the use of any particular elastomer, and therefore the choice of material can be dictated entirely by factors such as conditions of use, cost, and the like.

The invention will be described more specifically in connection with typical rubber stoppers and with the drawings, in which.

The stopper paper is shown

Figure 1:
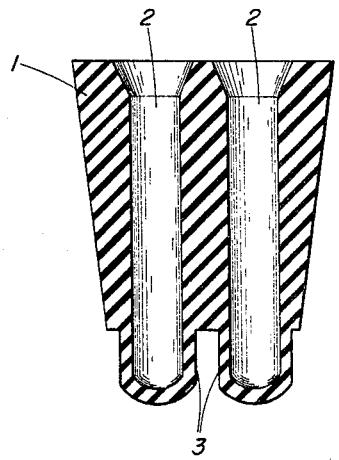
FIG. 1 is a section through a two-hole stopper.
Figure 2:
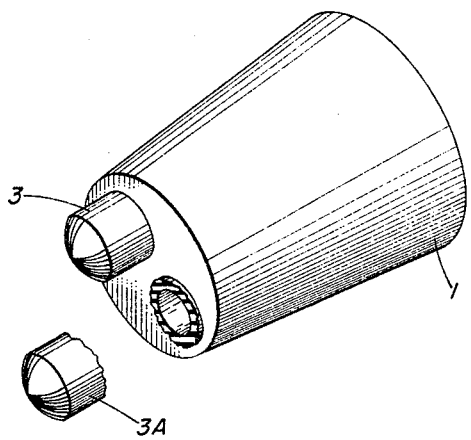
FIG. 2 is an elevation of a two-hole stopper with one projection shown just after having been twisted off.

The stopper proper is shown at 1 with the two holes at 2 and the hollow, convex projections at 3. FIG. 2 shows one of the projections 3A after it has been twisted off.

It will be noted that after a projection has been twisted off, the hole is clear and there is no more strain on a tube, such as a glass tube, which is forced through it than in the case of the standard stopper where the holes are permanently present. There is no problem of additional strain on a brittle tubing, such as glass, which occurs when a membrane has to be ruptured thereby. This is not to say that the present stopper should be used carelessly, and the usual precautions should be followed, such as for example wetting the tubing before insertion.

The stopper has been illustrated in the drawings of the standard, tapered shape, but any other special shape may be used, for of course the invention is in no way concerned with the general shape of the stopper.

It is an advantage of the stoppers of the present invention that while the twist-off feature can be used, which prevents contamination of the bottom face of the stopper, it is perfectly possible to snip off one or more projections with a pair of scissors. This is easy and convenient but does not lend itself quite as readily to aseptic conditions as when they are twisted off by grasping the projections at a substantial distance from the bottom of the stopper.

Ordinarily the stoppers of the present invention are sufficiently cheap so that there is no occasion to try to reuse a stopper with one or more projections which have been twisted off as a solid stopper. However, in an emergency if there is no solid stopper of the right size available, the twisted off projections can be used as plugs to plug up the bottom hole or holes after the glass tubing has been withdrawn. When the projections are forced into the hole they are compressed and so will usually be sufficiently tight for emergency use as a solid stopper. The problem of cleaning holes ordinarily does not arise because when the stopper with glass tubing is withdrawn from a flask and the tubing taken out, the holes are not filled with the liquid which was in the flask originally. The possibility in an emergency of using a stopper which had been employed with one or more holes as a solid stopper is an advantage of the present invention even though occasion for such use will be very rare in a laboratory.

I claim:

1. A dual purpose elastic stopper comprising a stopper body of elastomer, at least one hole forming an open passageway running therethrough from the top of the stopper to the bottom, a closed-end hollow projection over the bottom of any hole present, the outer diameter of the projection being small in comparison to the diameter of the bottom of the stopper and being positioned inwardly from the periphery of the bottom of the stopper, said projection being sufficiently weak so that it can be twisted off but sufficiently strong to resist puncturing or rupture under operating conditions.

2. A stopper according to claim 1 in which the elastomer is a vulcanized rubber.

References Cited by the Examiner
UNITED STATES PATENTS 2,153,981 4/1939 Heineman.
2,393,578 1/1946 Waite.

JOSEPH R. LECLAIR, *Primary Examiner.*

D. F. NORTON, *Assistant Examiner.*